(12) United States Patent
Nguyen-Schaefer

(10) Patent No.: US 9,464,637 B2
(45) Date of Patent: Oct. 11, 2016

(54) ROLLING BEARING ASSEMBLY OF AN EXHAUST GAS TURBOCHARGER

(75) Inventor: Thanh-Hung Nguyen-Schaefer, Asperg (DE)

(73) Assignee: BOSCH MAHLE TURBO SYSTEMS GMBH & CO. KG (DE)

( * ) Notice: Subject to any disclaimer, the term of this patent is extended or adjusted under 35 U.S.C. 154(b) by 0 days.

(21) Appl. No.: 14/239,258

(22) PCT Filed: Aug. 2, 2012

(86) PCT No.: PCT/EP2012/065122
§ 371 (c)(1),
(2), (4) Date: Jul. 6, 2015

(87) PCT Pub. No.: WO2013/023930
PCT Pub. Date: Feb. 21, 2013

(65) Prior Publication Data
US 2015/0233382 A1 Aug. 20, 2015

(30) Foreign Application Priority Data
Aug. 18, 2011 (DE) .......... 10 2011 081 200

(51) Int. Cl.
*F04D 29/059* (2006.01)
*F02B 47/08* (2006.01)
(Continued)

(52) U.S. Cl.
CPC ............ *F04D 29/059* (2013.01); *F02B 47/08* (2013.01); *F04D 17/00* (2013.01); *F04D 25/045* (2013.01); *F04D 29/063* (2013.01); *F16C 33/6666* (2013.01)

(58) Field of Classification Search
CPC ............ F04D 29/0462; F04D 29/049; F04D 29/0563; F04D 29/059; F04D 29/04; F04D 29/046; F04D 29/05; F04D 29/056; F04D 17/00; F04D 25/045; F01D 25/16; F01D 25/125; F16C 33/6666
See application file for complete search history.

(56) References Cited

U.S. PATENT DOCUMENTS 4,329,000 A 5/1982 Keske
4,708,602 A * 11/1987 McEachern, Jr. ..... F01D 25/164
  385/474
(Continued)

FOREIGN PATENT DOCUMENTS

DE  3531313 A1  3/1986
DE  102009048511 A1  4/2011
(Continued)

OTHER PUBLICATIONS

English abstract for EP-1273764.
English abstract for DE-102009048511.
German Search Report for DE102011081200.8 date Apr. 10, 2012.

*Primary Examiner* — Craig Kim
*Assistant Examiner* — Michael Sehn
(74) *Attorney, Agent, or Firm* — Fishman Stewart PLLC

(57) ABSTRACT

A rolling bearing assembly for a rotor of a turbine includes a bearing housing and a bearing cartridge. The bearing cartridge may include an outer shell and an inner shell arranged concentrically thereto. The outer and inner shell may be rotatably mounted on one another about a concentric axis of rotation in two bearing sections axially spaced from one another via rolling bodies. The inner shell may be arranged on a rotor shaft and in the region of the bearing sections includes an inner press fit region. The outer shell may be arranged in the bearing housing and have axially spaced from the bearing sections at least one outer press fit region. In the respective bearing sections an oil damping ring channel may be radially formed between the bearing housing and the outer shell. The oil damping ring channel may extend coaxially to the axis of rotation.

19 Claims, 2 Drawing Sheets

(51) Int. Cl.
*F04D 29/063* (2006.01)
*F04D 17/00* (2006.01)
*F04D 25/04* (2006.01)
*F16C 33/66* (2006.01)

(56) References Cited

U.S. PATENT DOCUMENTS

| | | | |
|---|---|---|---|
| 4,721,441 A | 1/1988 | Miyashita et al. | |
| 4,798,523 A | 1/1989 | Glaser et al. | |
| 5,150,973 A | 9/1992 | Masur et al. | |
| 7,675,211 B2 * | 3/2010 | Dimascio | F03D 11/0008 29/889 |

FOREIGN PATENT DOCUMENTS

| | | | |
|---|---|---|---|
| DE | 102010035665 A1 | 3/2012 | |
| EP | 0272151 A2 | 6/1988 | |
| EP | 1273764 A1 | 1/2003 | |
| EP | 2141373 A1 | 1/2010 | |
| WO | WO-2008/011400 A2 | 1/2008 | |
| WO | WO-2009/133445 A1 | 11/2009 | |
| WO | WO-2010/129407 A2 | 11/2010 | |
| WO | WO 2010129407 A2 * | 11/2010 | F01D 25/16 |

\* cited by examiner

ROLLING BEARING ASSEMBLY OF AN EXHAUST GAS TURBOCHARGER

CROSS-REFERENCE TO RELATED APPLICATIONS

This application claims priority to German Patent Application Number 10 2011 081 200.8, filed Aug. 18, 2011, and International Patent Application No. PCT/EP2012/065122, filed Aug. 2, 2012, both of which are hereby incorporated by reference in their entirety.

TECHNICAL FIELD

The present invention relates to a rolling bearing assembly for a rotor of a turbine, preferentially of an exhaust gas turbocharger. The present invention additionally relates to an exhaust gas turbocharger for an internal combustion engine, in particular of a motor vehicle or a utility machine, which is equipped with a rolling bearing assembly of the type described above.

BACKGROUND

From DE 35 31 313 C3 a rolling bearing assembly for a rotor of a turbine of an exhaust gas turbocharger is known, which comprises a bearing housing, in which an outer bearing shell is mounted in a floating manner in order to form a hydrodynamic slide bearing. Coaxially within the outer bearing shell, an inner bearing shell is provided, which is connected to a rotor shaft of the rotor in a rotationally fixed manner. Axially, on both sides of the inner bearing shell, two inclined ball bearings are arranged on the rotor shaft, which are supported outside on the outer bearing shell. Each inclined ball bearing comprises an inner race with an inner raceway for the rolling bodies and an outer race with an outer raceway for the rolling bodies. The two inner races are axially supported on the inner bearing shell. The outer race of the one inclined ball bearing is supported on a ring step of the outer bearing shell. The outer race of the other inclined ball bearing is supported on the outer bearing shell via a coil compression spring.

From EP 1 273 764 B1 a further rolling bearing assembly for a rotor of an exhaust gas turbocharger is known, in which an outer bearing shell is mounted on a rotor shaft of the rotor via two radial ball bearings axially spaced from one another. The outer bearing shell in turn is supported on the bearing housing in a vibration-damped manner via elastomer rings.

The use of rolling body bearings, in particular of inclined ball bearings, reduces the friction that occurs between rotor shaft and bearing housing at lower rotational speeds. During the operation of the rolling bearing assembly, i.e. with rotating rotor, oscillations with higher orders or vibrations can occur, which can induce a noise development within the rolling bearing assembly. Such a noise development in this case is frequently perceived as a disadvantage. In addition to this, the oscillations and vibrations that are responsible for the noise development can also lead to a higher component loading within the rolling bearing assembly.

SUMMARY

The present invention deals with the problem of stating an improved embodiment for a rolling bearing assembly of the type mentioned at the outset or for an exhaust gas turbocharger equipped with such a rolling bearing assembly, which is characterized in particular in that the tendency towards noise development is reduced.

With the present invention, this problem is solved in particular through the subjects of the independent claims. Advantageous embodiments are subject of the dependent claims.

The invention is initially based on the idea of inserting a bearing cartridge in the bearing housing, which comprises an outer shell and an inner shell concentrically thereto, which are rotatably mounted on one another about a concentric axis of rotation in each case via rolling bodies in two bearing sections which are axially spaced from one another. Here, the bearing cartridge represents a structural unit, which comprises the inner shell, the outer shell and the mounting between inner shell and outer shell. Here it is quite possible that the bearing cartridge is only completed upon assembly to the rotor shaft.

For the installation of the bearing cartridge in the bearing housing, the inner shell according to the invention is pressed onto the rotor shaft of the rotor on the outside, wherein the inner shell has an inner press fit region in the region of each of the bearing sections. Furthermore, the outer shell according to the invention is pressed into the bearing housing on the inside, wherein the outer shell axially spaced from the bearing sections comprises at least one outer press fit region. In other words, the at least one outer press fit region, which is formed between the outer shell and the bearing housing, is located axially between the two inner press fit regions, which are formed between the inner shell and the rotor shaft. This additionally signifies that between the outer shell and the bearing housing in the region of the bearing sections no press fit is present but radial play is rather present there. This radial play in the rolling bearing assembly introduced here is realised in the form of an oil damping ring channel, which is radially formed in the respective bearing section between the bearing housing and the outer shell. The respective oil damping ring channel extends coaxially to the axis of rotation and is bounded distally to the respective axial face end of the cartridge, i.e. bounded axially inside by the respective outer press fit region. Furthermore, the respective oil damping ring channel is arranged proximally to the respective axial face end of the cartridge, i.e. bounded axially on the outside by a closing ring, which is arranged on the bearing housing. The respective press fit causes a rotationally fixed connection between inner shell and the rotor shaft or between the outer shell and the bearing housing. Through the axial spacing between the inner press fit regions and the respective outer press fit region, a comparatively high radial preload can be realised in the respective bearing section, which significantly influences the oscillation behaviour of the rolling bearing assembly. By way of the respective oil damping ring channel, an oil flow can be created which causes a certain oscillation damping within the respective oil damping ring channel of the outer shell relative to the bearing housing. This oscillation-damping effect can be significantly improved through the closing ring which in this case is provided on the face end of the cartridge. For example, the closing ring, because of its throttling effect, makes possible a higher oil pressure in the respective oil damping ring channel.

According to a particularly advantageous embodiment, the respective closing ring can be arranged in a contactless manner with respect to the outer shell. In other words, the respective closing ring is arranged free of contact with the outer shell. In this way, a physical oscillation transmission from the outer shell to the bearing housing for example in the region of the axial face end of the cartridge can be avoided. Because of this, the oscillation damping can be realised particularly effectively through the respective oil damping ring gap.

Practically, axial play can be formed between the respective closing ring and the outer shell, as a result of which any contact between closing ring and outer shell can be avoided in the axial direction.

Practically, radial play can be formed between the respective closing ring and the outer shell, as a result of which any physical contact between the respective closing ring and the outer shell can be avoided in the radial direction.

The respective closing ring in particular can be a sealing disc or a shaft sealing ring or a snap ring. Depending on available installation space and depending on the closing effect to be achieved, the choice can be made from the embodiments of the closing ring mentioned above. In principle, another embodiment can also be utilised for realising such a closing ring.

According to another advantageous embodiment, the respective closing ring can radially dip into an annular seating, in particular into a ring step or a ring groove, which is formed on the outer shell in the region of the respective axial face end. Because of this, a kind of labyrinth seal is realised between the respective closing ring and the outer shell, which improves the sealing effect of the closing ring for the respective oil damping ring channel. Accordingly, higher oil pressures for example can be realised in the respective oil damping ring channel.

In another advantageous embodiment, the respective closing ring can be inserted on the bearing housing in an annular circumferential seating, which can for example be configured as a ring groove or as a ring step. In particular, said seating can be arranged axially offset to the inside with respect to the associated axial face end of the bearing housing. Through the design proposed here, a closing ring can be used for example, which is constructed comparatively large in the radial direction and which is characterized for example through a particularly high stability.

In an alternative embodiment, the respective closing ring can be arranged on the respective axial face end of the bearing housing. This embodiment is advantageous in particular when in the region of the axial face end of the bearing housing, adequate installation space for accommodating the respective closing ring is available. In contrast with this, the previously mentioned embodiment, which works with a circumferential seating formed on the bearing housing, is comparatively expensive to realise but correspondingly compact in construction instead.

According to another advantageous embodiment, the bearing housing for each oil damping ring channel can comprise an oil feed opening, which opens into the oil damping ring channel. Furthermore, for each oil damping ring channel at least one oil injection nozzle is provided, which penetrates the outer shell and is arranged substantially located opposite preferentially diametrically of the respective oil feed opening or offset by approximately 90° in the circumferential direction thereto. Practically, all oil injection nozzles are arranged located diametrically opposite the respective oil feed opening. Through the design proposed here it is achieved that an oil flow entering the oil damping ring channel via the respective oil feed openings to initially spread out in the respective oil damping ring channel by at least 180° in the circumferential direction before it reaches the respective oil injection nozzle. A part of the oil flow can now enter a radial intermediate space between inner shell and outer shell through the respective oil injection nozzle, in which radial intermediate space the rolling bodies of the two bearing sections are located. Thus, adequate lubrication and/or cooling of the rolling bodies can be ensured via the respective oil injection nozzle.

Practically, the respective oil injection nozzle can be orientated to the respective bearing section for this purpose, so that the respective oil injection nozzle injects the oil in the direction of the rolling bodies of the respective bearing section in the previously mentioned intermediate space.

Practically, the rolling bearing assembly can be additionally provided with an oil drain, which practically penetrates the outer shell and the bearing housing on a side located diametrically opposite the oil feed openings. The oil drain can be dimensioned comparatively large, so that downstream of the oil injection nozzles, i.e. in particular in the intermediate space, an oil pressure is present, which compared with the oil damping ring channels is significantly reduced. Thus, the oil can rapidly drain from the intermediate space, which is an advantage for the cooling and lubricating of the rolling bodies.

In a practical embodiment, two outer press fit regions which are axially spaced from one another can be provided, which are each axially arranged between the two inner press fit regions or axially between the bearing sections. Practically, the oil drain mentioned above can now run or be arranged axially between the two outer press fit regions. It is possible, furthermore, to form axially between the two outer press fit regions, a middle ring channel which is circumferential in the circumferential direction, which in particular communicates with the oil drain. The use of two axially spaced outer press fit regions facilitates the assembly with adequate supporting of the outer shell on the bearing housing.

According to another advantageous embodiment, the inner shell can be axially divided in two and accordingly comprise two inner shell parts, which each comprise one of the already mentioned inner press fit regions in the region of the respective bearing section. The use of an inner shell divided in two facilitates the assembly of the bearing cartridge directly on the rotor shaft.

According to a particularly advantageous embodiment, an outer raceway of the rolling bodies can be integrally formed on the outer shell in the respective bearing section. Additionally or alternatively, an inner raceway of the rolling bodies can be integrally formed on the inner shell in the respective bearing section. Inner shell and outer shell then form integral parts of the respective rolling body bearing, so that for example separate races can be omitted. According to a particularly advantageous embodiment, the two bearing sections can be designed as inclined ball bearings, in which the raceways are not orientated radially to one another, but have an inclination to one another, which lies between the radial direction and the axial direction.

Practically, the inner raceway can axially support the rolling bodies, that is the balls, axially on the outside, while the outer raceway supports the rolling bodies axially inside.

An exhaust gas turbocharger according to the invention comprises a rotor, whose rotor shaft connects a turbine wheel of a turbine of the exhaust gas turbocharger to a compressor wheel of a compressor of the exhaust gas turbocharger in a rotationally fixed manner. Furthermore, the exhaust gas turbocharger according to the invention comprises a rolling bearing assembly of the type described above. The bearing housing of the rolling bearing assembly in this case can form a part of a housing of the exhaust gas turbocharger. Usually, an exhaust gas turbocharger comprises a turbine housing, in which the turbine wheel rotates, a compressor housing, in which the compressor wheel rotates, and a bearing housing, in which the rotor shaft is mounted. The bearing housing of the exhaust gas turbocharger in this case can correspond to the bearing housing of the rolling bearing assembly. In principle, however, embodiments are also conceivable, in which the bearing housing is integrally formed on the compressor housing or integrally formed on the turbine housing.

Further important features and advantages of the invention are obtained from the subclaims, from the drawings and from the associated Figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

In the drawings, and in each case schematically.

DETAILED DESCRIPTION

Figure 1:
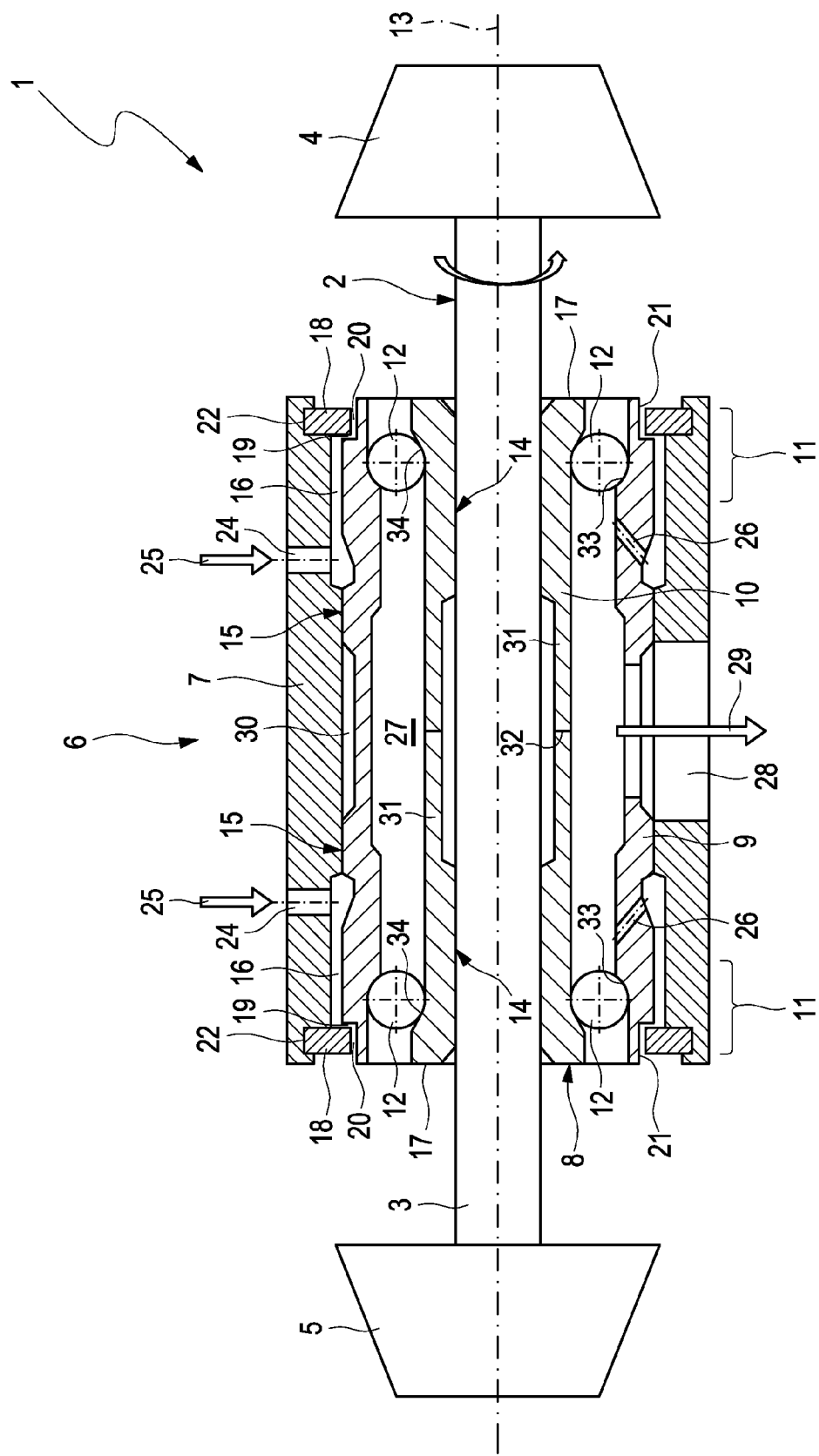
FIGS. 1 and 2 each illustrate a greatly simplified longitudinal section of an exhaust gas turbocharger in the region of a rolling bearing assembly, according to different examples.
Figure 2:
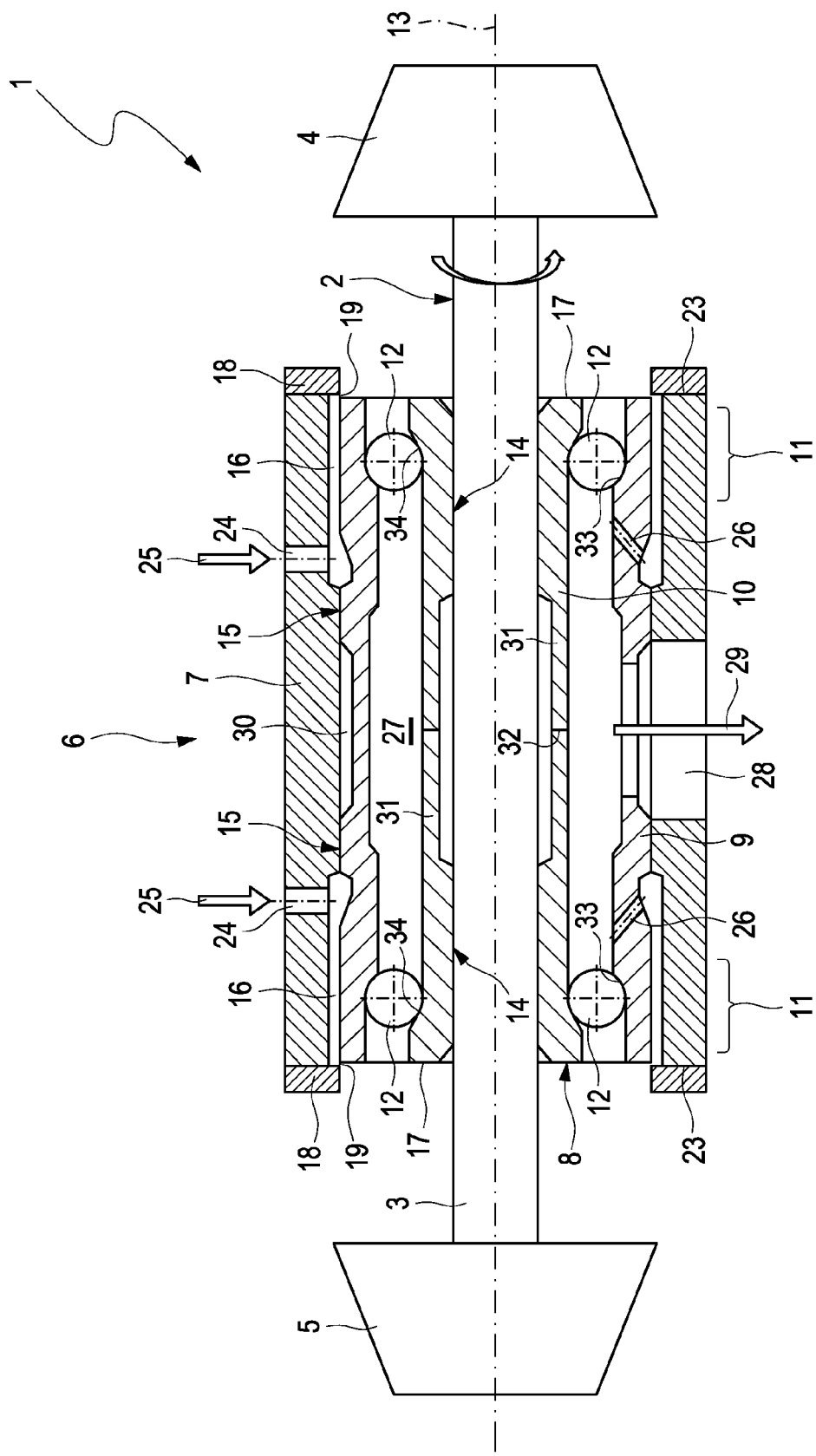

According to the FIGS. 1 and 2, an exhaust gas turbocharger 1 which is only partially shown, which is provided for use in an internal combustion engine, in particular in a motor vehicle, preferentially in a utility vehicle, or in a utility machine, comprises a rotor 2 with a rotor shaft 3, which connects a turbine wheel 4 of the rotor 2 with a compressor wheel 5 of the rotor 2 in a rotationally fixed manner. The turbine wheel 4 in this case additionally forms a part of a turbine of the exhaust gas turbocharger 1 which is not shown here. Likewise, the compressor wheel 5 simultaneously forms a part of a compressor of the exhaust gas turbocharger 1 which is not shown here. The exhaust gas turbocharger 1 furthermore comprises a rolling bearing assembly 6 for mounting the rotor 2. The rolling bearing assembly 6 to this end comprises a bearing housing 7, which is configured annularly. Furthermore, the rolling bearing assembly 6 comprises a bearing cartridge 8, which is inserted in the bearing housing 7. The bearing cartridge 8 has a sleeve-like outer shell 9 and concentrically thereto a sleeve-like inner shell 10. The inner shell 10 and outer shell 9 are rotatably mounted on one another about a concentric axis of rotation 13 in two bearing sections 11 each axially spaced from one another via rolling bodies 12. The inner shell 10 in this case is pressed on the rotor shaft 3 on the outside. In the process, two inner press fit regions 14 are formed, which are each located in the region of one of the bearing sections 11. In the respective inner press fit region 14 the inner shell 10 is connected to the rotor shaft 3 in a rotationally fixed manner, namely through a frictional connection.

The outer shell 9 is pressed into the bearing housing 7 on the inside. Here, at least one outer press fit region 15 is formed axially spaced from the bearing sections 11. In the examples shown here, two such outer press fit regions 15 each are provided, which are axially spaced from one another. In the respective outer press fit region 15, the outer shell 9 is connected to the bearing housing 7 in a rotationally fixed manner, namely by way of a frictional connection. The outer press fit regions 15 are arranged axially between the bearing sections 11 or axially between the two inner press fit regions 14.

In the respective bearing section 11, the rolling bearing assembly 6 additionally comprises an oil damping ring channel 16 each, which for this purpose is formed radially between the bearing housing 7 and the outer shell 9. The two oil damping channels 16 in this case extend coaxially to the axis of rotation 13. The two oil damping ring channels 16 are bounded distally to the respective axial face end 17 of the bearing cartridge 8 through the respective outer press fit region 15 and proximally to the respective axial face end 17 of the bearing cartridge 8 through a closing ring 18. The respective closing ring 18, for example in the form of a snap ring, in this case is arranged axially fixed on the bearing housing 7, e.g. screwed to the latter or snapped into the latter.

In the embodiment shown in FIG. 1, an axial play 19 is formed between the respective closing ring 18 and the outer shell 9, so that the respective closing ring 19 in the axial direction has no contact with the outer shell 9. In addition, a radial play 20 is formed here between the respective closing ring 18 and the outer shell 9, so that the respective closing ring 18 does not have any contact to the outer shell 9 radially either. Furthermore, an annularly circumferential seating 21 is formed on the outer shell 9 for each closing ring 18 in the embodiment shown in FIG. 1, namely in the region of the respective axial face end 17. The seating 21 in the example is configured as a ring step and accordingly is axially open on the respective face end 17. Alternatively, the seating 21 can also be configured as a ring groove.

In the example of FIG. 1, a circumferential seating 22 is additionally formed for each closing ring 18 on the bearing housing 7, in which the respective closing ring 18 is radially inserted. The respective seating 22 in this case is designed as a ring groove, but it can likewise be configured as a ring step. It is noteworthy that with the embodiment shown in the FIG. 1 the respective closing ring 18 is arranged axially offset to the inside with respect to the axial face end 17 of the cartridge 8 or of the bearing housing 7. Because of this, the rolling bearing assembly 6 shown here is a comparatively compact construction axially.

As closing ring 18, a shaft sealing ring or a snap ring is employed for example in the embodiment shown in FIG. 1.

In the embodiment shown in FIG. 2, the respective closing ring 18 is attached in each case to an axial face end 23 of the bearing housing 7, so that the respective closing ring 18 axially protrudes over the cartridge 8. Here, too, an axial play 19 is formed axially between the respective closing ring 18 and the outer shell 9. Furthermore, the respective closing ring 18 overlaps the outer shell 9 in the radial direction.

In the embodiment shown in FIG. 2, a sealing disc is preferentially used as a closing ring 18.

In both embodiments it is ensured through the respective play 19, 20 that the closing rings 18 are arranged contactless or free of contact with respect to the outer shell 9.

In the embodiments of the FIGS. 1 and 2, the bearing housing 7 for each oil damping ring channel 16 comprises an oil feed opening 24, which opens into the oil damping ring channel 16 and via which corresponding to an arrow 25 oil can be fed into the respective oil damping ring channel 16. For each oil damping ring channel 16, at least one oil injection nozzle 26 is additionally provided, wherein the respective oil injection nozzle 26 radially penetrates the outer shell 9 and in the process is substantially arranged preferentially diametrically opposite or offset by at least 90° in the circumferential direction to the respective oil feed opening 24. Practically, all oil injection nozzles 26 are arranged substantially diametrically opposite the respective oil feed opening 24. This enforces that the oil has to flow from the oil feed opening 24 in the oil damping ring channel 16 initially in the circumferential direction over at least 180°, before it can overflow via the oil injection nozzle 26 into an annular intermediate space 27, which is formed radially between the inner shell 10 and the outer shell 9 and in which the rolling bodies 12 of the two bearing sections 11 are arranged. Here, the oil injection nozzles 26 are realised in the form of bores, which with respect to the radial direction run at an incline, in particular with an angle of approximately 45°. The oil injection nozzles 26 are orientated to the respective bearing section 11, so that the oil is injected in the intermediate space 27 via the respective oil injection nozzle 26 in the direction of the rolling bodies 12.

The rolling bearing assembly 6 is additionally equipped with an oil drain 28, through which the oil can drain corresponding to an arrow 29. The oil drain 28 in this case penetrates the inner shell 9 and aligned thereto, additionally the bearing housing 7. In the example, the oil drain 28 is positioned axially between the two outer press fit regions 15. Furthermore, a middle ring channel 30 is arranged axially between the two oil damping ring channels 16 axially between the outer press fit regions 15, which is fluidically connected to the oil drain 28.

The inner shell 8 is practically divided in two axially. Accordingly, the inner shell 8 in this case comprises two inner shell parts 31, which meet axially at the face end in a butt joint 32.

In the embodiments shown here, the inner shell 10 and the outer shell 9 are directly mounted on one another via the rolling bodies 12, wherein the rolling bodies 12 in this case are configured as balls and the bearing sections 11 accordingly form ball bearings. In the example, the two bearing sections 11 are designed as inclined ball bearings, wherein an outer raceway 33 of the respective inclined ball bearing is integrally formed on the outer shell 9, while an inner raceway 34 of the respective inclined ball bearing is integrally formed on the inner shell 10. Here, the outer raceways 33 axially support the rolling bearings 12 to the inside, while the inner raceways 34 axially support the rolling bodies 12 to the outside.

The bearing cartridge 8 and in particular the entire rolling bearing assembly 6 is configured axially mirror-symmetrically in the examples shown here.

The invention claimed is:

1. A rolling bearing assembly for a rotor of a turbine, comprising:
   a bearing housing and
   a bearing cartridge having an outer shell and concentrically thereto an inner shell, the outer and inner shell rotatably mounted on one another about a concentric axis of rotation via roller bodies disposed in two bearing sections axially spaced from one another,
   wherein the inner shell is arranged on a rotor shaft and in the region of the bearing sections has an inner press fit region coupling the inner shell to the rotor shaft via a press fit connection,
   wherein the outer shell is arranged in the bearing housing, the outer shell having axially spaced from the bearing sections and at least partially axially offset from the inner press fit region at least one outer press fit region rotationally coupling the outer shell to the bearing housing via a press fit connection,
   in the respective bearing section of the bearing cartridge an oil damping ring channel is disposed radially between the bearing housing and the outer shell, the respective oil damping ring channels extending coaxially to the axis of rotation and bounded distally to a respective axial face end of the bearing cartridge through the at least one outer press fit region, and
   wherein the respective oil damping ring channel is bounded proximally to the respective axial face end of the bearing cartridge through a closing ring arranged on the bearing housing;
   wherein at least one of:
   an axial play is formed between the respective closing ring and the outer shell; and
   a radial play is formed between the respective closing ring and the outer shell to facilitate a contactless arrangement between the respective closing ring and the outer shell.

2. The rolling bearing assembly according to claim 1, wherein the axial play is formed between the respective closing ring and the outer shell.

3. The rolling bearing assembly according to claim 1, wherein the radial play is formed between the respective closing ring and the outer shell.

4. The rolling bearing assembly according to claim 1, wherein the respective closing ring is at least one of a sealing disc, a shaft sealing ring and a snap ring.

5. The rolling bearing assembly according to claim 1, wherein the respective closing ring radially dips into an annular seating, the annular seating formed on the outer shell in the region of the respective axial face end of the bearing cartridge to facilitate at least one of an axial play and a radial play between the respective closing ring and the outer shell.

6. The rolling bearing assembly according to claim 1, wherein at least one of:
   the respective closing ring is inserted into an annular seating on the bearing housing, and
   the respective closing ring is arranged on a respective axial face end of the bearing housing.

7. The rolling bearing assembly according to claim 1, wherein:
   the bearing housing for each oil damping ring channel includes an oil feed opening, which opens into the respective oil damping ring channel, and
   each oil damping ring channel includes at least one oil injection nozzle, the at least one oil injection nozzle penetrates the outer shell and is arranged opposite the respective oil feed opening.

8. The rolling bearing assembly according to claim 7, wherein the at least one oil injection nozzle is arranged at least one of diametrically opposite the outer shell and at least at a 90° angle with the outer shell.

9. The rolling bearing assembly according to claim 1, wherein the outer shell includes two outer press fit regions axially spaced from one another and offset axially inwards from the inner press fit region.

10. The rolling bearing assembly according to claim 1, wherein the inner shell is axially divided having two inner shell parts, each inner shell part including an inner press fit region in the region of the respective bearing section, and wherein the inner press fit region of each inner shell part rotationally couples the two inner shell parts to the rotor shaft via a press fit connection.

11. The rolling bearing assembly according to claim 1, wherein the respective bearing sections include at least one of an outer raceway of the rolling bodies integrally formed on the outer shell and an inner raceway of the rolling bodies integrally formed on the inner shell.

12. An exhaust gas turbocharger for an internal combustion engine, comprising:
    a rotor having a rotor shaft connecting a turbine wheel to a compressor wheel in a rotationally fixed manner, and
    a rolling bearing assembly including:
        a bearing housing, and
        a bearing cartridge, the bearing cartridge having an outer shell and an inner shell arranged concentrically thereto, the outer and inner shell rotatably mounted on one another about a concentric axis of rotation via rolling bodies disposed in two bearing sections axially spaced from one another,
        wherein the inner shell is arranged on the rotor shaft and has an inner press fit region in the region of the bearing sections rotationally coupling the inner shell to the rotor shaft via a press fit connection,
        wherein the outer shell is arranged in the bearing housing, the outer shell having at least one outer press fit region axially spaced from the bearing sections and at least partially axially offset from the inner press fit region, the at least one outer press fit region rotationally coupling the outer shell to the bearing housing via a press fit connection,
        the respective bearing sections having an oil damping ring channel radially formed between the bearing housing and the outer shell,
        the respective oil damping ring channels extending coaxially to the axis of rotation and bounded distally to a respective axial face end of the bearing cartridge through the respective outer press fit region, and the respective oil damping ring channels bounded proximally to the respective axial face end of the bearing cartridge through a closing ring arranged on the bearing housing;
        wherein a radial play is formed between the closing ring and the outer shell to facilitate a contactless arrangement between the closing ring and the outer shell.

13. The exhaust gas turbocharger according to claim 12, further comprising an axial play formed between the respective closing ring and the outer shell.

14. The exhaust gas turbocharger according to claim 12, wherein the respective closing ring includes at least one of a sealing disc, a shaft sealing ring and a snap ring, and wherein at least one of:
    the respective closing ring is inserted into an annular seating disposed on the bearing housing; and
    the respective closing ring is arranged on a respective axial end face of the bearing housing.

15. The exhaust gas turbocharger according to claim 12, wherein the respective closing ring radially dips into an annular seating formed on the outer shell in the region of the respective axial face end of the bearing cartridge.

16. The exhaust gas turbocharger according to claim 12, wherein the bearing housing includes an oil feed opening for each oil damping ring channel, the respective oil feed opening opens into the respective oil damping ring channel; and
    wherein each oil damping ring channel includes at least one oil injection nozzle, the at least one oil injection nozzle penetrates the outer shell and is arranged opposite the respective oil feed opening.

17. The exhaust gas turbocharger according to claim 12, wherein the inner shell is axial divided including two inner shell parts, each inner shell part having an inner press fit region in the region of the respective bearing section.

18. The exhaust gas turbocharger according to claim 12, wherein the respective bearing section includes at least one of an outer raceway of the rolling bodies integrally formed on the outer shell, and an inner raceway of the rolling bodies integrally formed on the inner shell.

19. A rolling bearing assembly for a rotor of an exhaust gas turbocharger, comprising:
    a bearing housing; and
    a bearing cartridge arranged in the bearing housing, the bearing cartridge including an outer shell and an inner shell arranged concentrically thereto, the outer shell and the inner shell rotatably mounted on one other about a rotation axis via roller bodies disposed in at least two bearing sections axially spaced from one another;
    wherein the inner shell is arranged on a rotor shaft and has an inner press fit region disposed at each of the at least two bearing sections;
    wherein the outer shell is arranged on the bearing housing, the outer shell having at least one outer press fit region axially spaced from the at least two bearing sections;
    wherein the bearing cartridge includes an oil damping ring channel arranged extending along each of the at least two bearing sections coaxially to the rotation axis and disposed radially between the bearing housing and the outer wall, wherein the respective oil damping ring channels are bounded distally to a respective axial end face of the bearing cartridge via the at least one outer press fit region and bounded proximally to the respective axial end face of the bearing cartridge via a closing ring arranged on the bearing housing; and
    wherein an axial play is defined between the respective closing ring and the outer shell.

* * * * *